US007607122B2

(12) United States Patent
Hatlelid et al.

(10) Patent No.: US 7,607,122 B2
(45) Date of Patent: Oct. 20, 2009

(54) POST BUILD PROCESS TO RECORD STACK AND CALL TREE INFORMATION

(75) Inventors: Kristjan E. Hatlelid, Sammamish, WA (US); Uri London, Redmond, WA (US); Vladimir A. Shubin, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 552 days.

(21) Appl. No.: 11/156,126

(22) Filed: Jun. 17, 2005

(65) Prior Publication Data

US 2006/0288342 A1 Dec. 21, 2006

(51) Int. Cl.
G06F 9/44 (2006.01)
(52) U.S. Cl. ...................................................... 717/127
(58) Field of Classification Search ................. 717/127, 717/131–133; 726/22–24, 26–27, 30
See application file for complete search history.

(56) References Cited

U.S. PATENT DOCUMENTS

| | | | | |
|---|---|---|---|---|
| 4,454,579 A | * | 6/1984 | Pilat et al. | ................ 712/242 |
| 5,103,394 A | | 4/1992 | Blasciak | |
| 5,617,569 A | | 4/1997 | Gray et al. | |
| 5,663,721 A | | 9/1997 | Rossi | |
| 5,696,925 A | | 12/1997 | Koh | |
| 5,828,883 A | * | 10/1998 | Hall | ........................ 717/133 |
| 5,938,766 A | | 8/1999 | Anderson et al. | |
| 5,960,087 A | | 9/1999 | Tribble et al. | |
| 6,002,872 A | * | 12/1999 | Alexander et al. | .......... 717/127 |
| 6,006,328 A | | 12/1999 | Drake | |
| 6,049,838 A | | 4/2000 | Miller et al. | |
| 6,101,326 A | * | 8/2000 | Mattson, Jr. | ................ 717/151 |
| 6,138,269 A | | 10/2000 | Ball et al. | |
| 6,141,723 A | | 10/2000 | Lyons | |
| 6,158,024 A | * | 12/2000 | Mandal | ....................... 714/37 |
| 6,212,632 B1 | | 4/2001 | Surine et al. | |

(Continued)

FOREIGN PATENT DOCUMENTS

WO    WO 2004090733 A1    10/2004

OTHER PUBLICATIONS

Debray et al. "Profile-Guided code compression" Jun. 2002, ACM, pp. 95-105.*

(Continued)

*Primary Examiner*—Wei Y Zhen
*Assistant Examiner*—Anna Deng
(74) *Attorney, Agent, or Firm*—Woodcock Washburn LLP

(57) ABSTRACT

A mechanism is provided, where a post-build utility is used to store stack and call tree information within a section of an executable program or separate file. The stack information aids an authentication module during the execution of the program in walking up a stack in order to obtain return addresses on the stack. In one aspect of the invention, by comparing the return address sequence to the call tree sequence, which specifies the allowed function call sequence of the program, a determination can be made whether the program is executing (as evidenced by the stack) the way it should be executing (as required by the call tree). If the call tree sequence differs from the return address sequence, a suspicion is raised that a hacker is attempting to jump from foreign code into sensitive code of the program by changing the function calling sequence.

15 Claims, 9 Drawing Sheets

U.S. PATENT DOCUMENTS

| | | | |
|---|---|---|---|
| 6,345,313 | B1 | 2/2002 | Lindholm |
| 6,446,259 | B2 | 9/2002 | Brett |
| 6,467,052 | B1* | 10/2002 | Kaler et al. .................... 714/39 |
| 6,584,478 | B1 | 6/2003 | Spertus |
| 7,007,159 | B2 | 2/2006 | Wyatt |
| 7,093,239 | B1 | 8/2006 | van der Made |
| 7,155,741 | B2* | 12/2006 | Sobel et al. .................... 726/22 |
| 7,409,154 | B2* | 8/2008 | Wellen ........................ 398/19 |
| 2002/0013907 | A1* | 1/2002 | May ........................... 713/200 |
| 2004/0255163 | A1* | 12/2004 | Swimmer et al. ........... 713/201 |
| 2005/0066354 | A1 | 3/2005 | Dellow et al. |
| 2005/0289531 | A1* | 12/2005 | Illowsky et al. ............. 717/163 |
| 2006/0015937 | A1* | 1/2006 | Illowsky et al. .............. 726/18 |
| 2006/0020936 | A1 | 1/2006 | Wyatt |
| 2006/0026685 | A1* | 2/2006 | Saito ........................... 726/23 |
| 2006/0161739 | A1* | 7/2006 | Genty et al. ................. 711/152 |
| 2006/0195617 | A1 | 8/2006 | Arndt et al. |
| 2006/0242700 | A1* | 10/2006 | Fischer et al. ................ 726/22 |
| 2006/0265749 | A1 | 11/2006 | Kwon et al. |
| 2007/0101317 | A1* | 5/2007 | Shoji et al. .................. 717/131 |
| 2008/0060077 | A1* | 3/2008 | Cowan et al. ................. 726/25 |

OTHER PUBLICATIONS

Park et al. "Repairing Return Address Stack for Buffer Overflow Protection", 2004, ACM, SIGMICRO, pp. 335-342.*

Pietrek, M., "Under the Hood", Aug. 1996. Microsoft Systems Journal, http://www.microsoft.com/msj/archive/s402. aspx.

Gang, Qu., "Publicly Detectable Techniques for the Protection Virtual Components", Jun. 2001, ACM, DAC '01, 474-479.

Salles, et al., "Security of Runtime Extensible Virtual Environments", Sep. 2002, ACM, CVE '02, 97-104.

In the United States Patent and Trademark Office, Non-Final Office Action in re:. U.S. Appl. No. 11/102,341, filed Apr. 8, 2005, Dated Apr. 16, 2009, 16 pages.

In the United States Patent and Trademark Office, Non-Final Office Action in re:. U.S. Appl. No. 11/102,341, filed Apr. 8, 2005, Dated Jul. 22, 2008, 13 pages.

In the United States Patent and Trademark Office, Final Office Action in re:. U.S. Appl. No. 11/102,341, filed Apr. 8, 2005, Dated Apr. 9, 2008, 15 pages.

In the United States Patent and Trademark Office, Non-Final Office Action in re:. U.S. Appl. No. 11/102,341, filed Apr. 8, 2005, Dated Sep. 21, 2007, 12 pages.

In the United States Patent and Trademark Office, Notice of Allowance and Fee(s) Due in re:. U.S. Appl. No. 11/086,961, filed Mar. 21, 2005, Dated Jun. 19, 2008, 32 pages.

In the United States Patent and Trademark Office, Non-Final Office Action in re:. U.S. Appl. No. 11/086,961, filed Mar. 21, 2005, Feb. 21, 2008, 11 pages.

In the United States Patent and Trademark Office, Non-Final Office Action in re:. U.S. Appl. No. 11/086,961, filed Mar. 21, 2005, Dated Feb. 21, 2008, 11 pages.

* cited by examiner

Exemplary Implementation of a Stack 400

Recording the Call Tree 700

Comparing Return Address Sequence Information To Call Tree Information 800

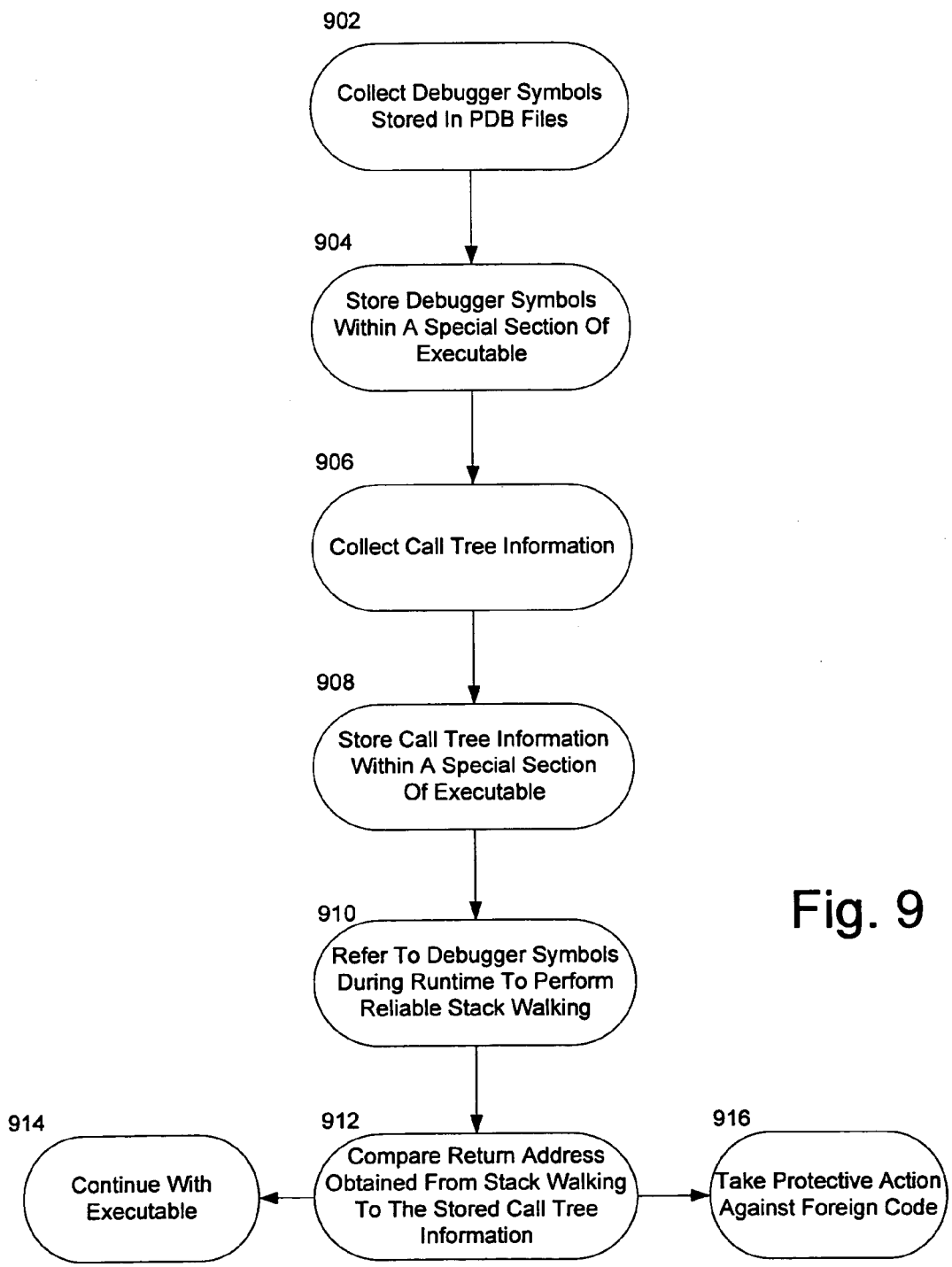

POST BUILD PROCESS TO RECORD STACK AND CALL TREE INFORMATION

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2004, Microsoft Corp.

CROSS-REFERENCE TO RELATED APPLICATIONS

This application is related to co-pending U.S. application Ser. No. 11/102,341, filed on Apr. 8, 2005, and to co-pending U.S. application Ser. No. 11/086,961, filed on Mar. 21, 2005.

TECHNICAL FIELD

The present invention relates generally to the field of computing. More particularly, the present invention relates to techniques of recording stack and call tree information, which can be used as part of a process that detects and/or prevents the execution of foreign code.

BACKGROUND

Computer systems today are subject to a variety of attacks that can disrupt or disable expected operation of a computer system and cause the system to behave in damaging or undesirable ways. Computer viruses, worms, and trojan horse programs are examples of different forms of attack. Attacks can also come from unscrupulous users of a computer system or remote hackers. Often these attacks take the form of attempts to modify existing program code executed by the computer system or attempts to inject new unauthorized program code at various stages of normal program execution within the computer system. Systems and methods for preventing such malicious attacks are becoming increasingly important.

Generally speaking, such attacks are implemented by causing the computer to execute foreign code. "Foreign" code, in this case, refers to code that is not intended or expected to execute in the process space of a particular program. It is typically written by a hacker to get into the process space of a program to accomplish some end, such as to delete, corrupt, or manipulate code or data for some other purpose, like unlawfully making unauthorized copies of music.

Preventing such attacks by foreign code assists in assuring the behavioral integrity of a computer system (or, at least, a particular program). One way to maintain integrity is to perform module authentication, in which the security of one or more software modules is protected against tampering. This provides a level of protection against malicious changes to the software such as code patching, redirection, and software breakpoints.

One form of module authentication is to ensure that content contained in the software module is unchanged (or, at least, that the portions of the module that are not expected to change, such as the code portions, actually remain unchanged). This may be done via static module authentication. Static module authentication is the process of verifying the persistently stored image of the module, which in some cases can be thought of as the "on-disk" module. For example, one mechanism to check the module on-disk may be accomplished by hashing the file and comparing the resulting hash value with a pre-computed hash value of the file that has been signed by a trusted signatory.

The process of hashing, is a well-known cryptographic technique for identifying data with a relatively unique, but substantially smaller representation than the original data. The hash can be taken on a binary source of arbitrary length, and the result of the hashing computation is a smaller, usually fixed-size piece of binary data known as a hash, hash value, or digest. For example, FIPS SHA-1 (Federal Information Processing Standards Secure Hash Algorithm 1) produces a 20-byte long hash regardless of the amount of data that is processed. A good hashing algorithm, like SHA-1, will produce significantly different hash values even for minute changes in the source data, or binary file in this case. Thus, when the expected attack is modification of the stored code, hashing is very effectively at allowing the modification to be detected.

However, not all attacks come in the form of modifications to the stored code. Some attacks are leveled without any modification to the program itself, but rather by modifying the runtime data in such a way that the program will jump into some foreign code created by a hacker, and then execute the foreign code in the program's address space. It would be advantageous to prevent all these kinds of foreign code attacks by recording stack and call tree information of a program, and then during the execution of that program, use this information to compare the actual execution sequence of the program to the intended execution of the program, where the actual execution is determined by stack walking and the obtaining of return addresses on the stack, and the intended execution of the program is obtained from the call tree information.

SUMMARY

A mechanism is provided whereby stack and call tree information is used to thwart attacks by foreign code. In one aspect of the invention, a post-build utility is provided and this utility stores stack and call tree information within a section of an executable program. When the program is executed, an authentication module can use this information to perform reliable stack walking to obtain return addresses on a selected stack and also to determine whether these return addresses are consistent with the program's call tree. The post-build utility collects this information from sources such as debug symbol files that contain information about the executable program. Such information can include a function's frame size at various points during its execution, and legitimate function call sequences.

In another aspect of the invention, an authentication module walks up the stack in order to identify the return addresses on the stack and determine if they are consistent with a legitimate call sequence for the program. Return addresses that would cause the program to return into code which is not part of a legitimate call sequence may indicate that the stack has been modified to cause the program to jump into foreign code. In the call sequence aspect of the invention, the authentication module can verify whether a given function is returning to a function that legitimately could have called the given function, or if the given function may return to a function that is inconsistent with the program's call tree. If the return address is not consistent with a legitimate call sequence, then the return address may refer to foreign code, or may otherwise indicate that the program's normal call sequence has been disrupted by a hacker. Thus, both the stack and call tree information stored within the executable by the post-build utility aid an authentication module in guarding against any hacking of a computer system by foreign code.

Other features of the invention are described below.

BRIEF DESCRIPTION OF THE DRAWINGS

The foregoing summary, as well as the following detailed description of the invention, is better understood when read in conjunction with the appended drawings. In order to illustrate the invention, exemplary embodiments are shown depicting various aspects of the invention. However, the invention is not limited to the specific systems and methods disclosed. The following figures are included:

FIG. 9 illustrates an exemplary block diagram of a post-build process that aids an authentication module in stack walking and call tree authentication.

DETAILED DESCRIPTION

Overview

In various aspects of the invention, a post-build utility is provided that collects stack and call tree information about an executable program, and then later uses that information to perform reliable stack walking and authentication of function call sequence, respectively. The stack information, which includes information like debug symbol files, is used to reliably walk the stack during the execution of the program. The purpose of stack walking is to obtain return addresses which are indicative of the call sequence on a stack. Thus, these return address can be compared to the call tree information which contains the intended call sequence of the executable program. In short, by comparing the actual call sequence as evidenced by the return address on the stack to the intended call sequence as evidenced by the call tree, a determination can be made whether foreign code is present in the call flow. If the actual and intended call sequences are the same, then no foreign code is present. If, however, the two sequences don't match up, foreign code may be present and protective measures must be taken.

Exemplary Computing Environment

Figure 1:
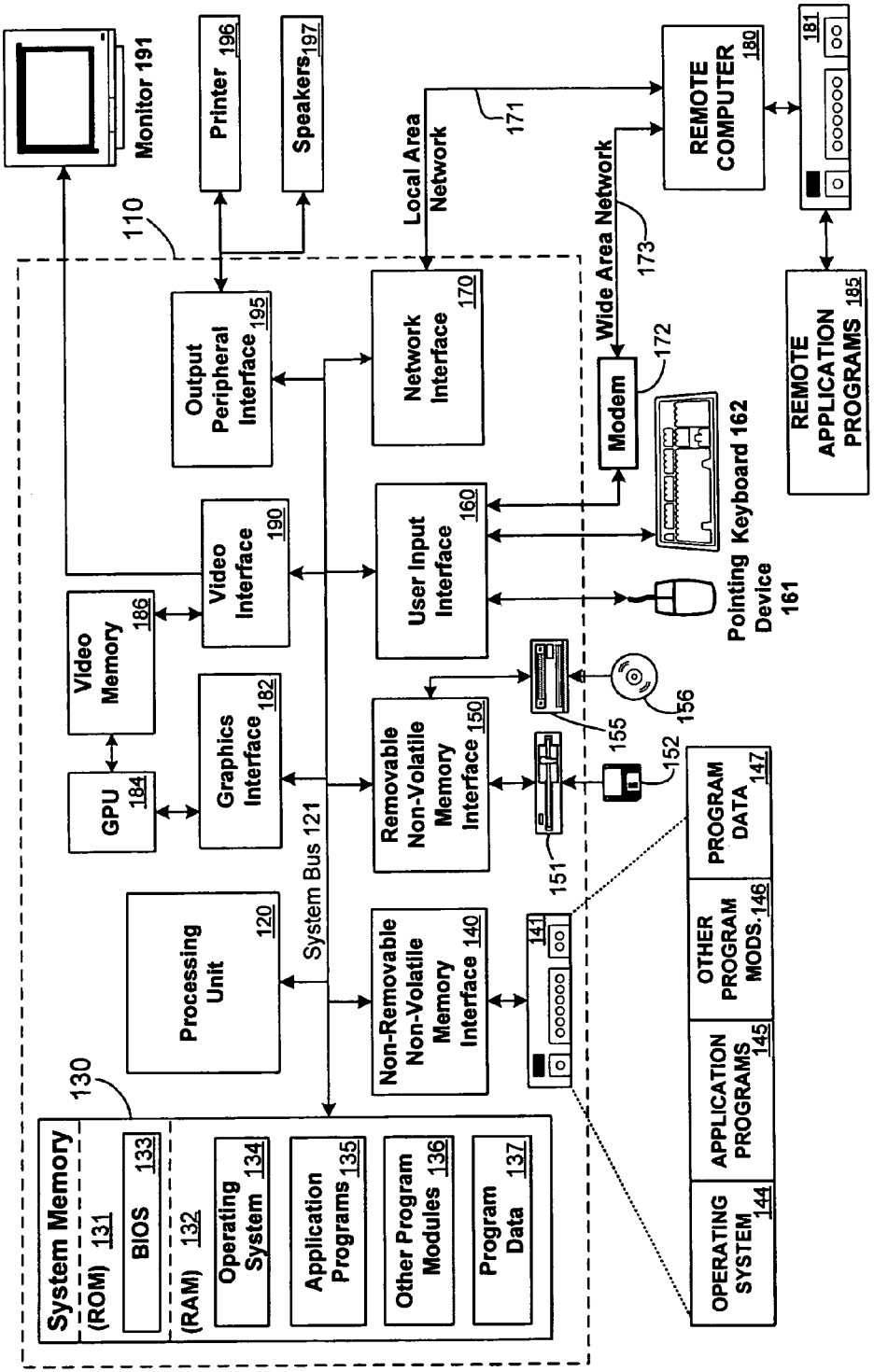
FIG. 1 provides a brief general description of a suitable computing device in connection with which the invention may be implemented.

FIG. 1 and the following discussion are intended to provide a brief general description of a suitable computing device in connection with which the invention may be implemented. For example, any of the client and server computers or devices illustrated in FIG. 1 may take this form. It should be understood, however, that handheld, portable and other computing devices and computing objects of all kinds are contemplated for use in connection with the present invention, i.e., anywhere from which data may be generated, processed, received and/or transmitted in a computing environment. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the object persistence methods of the invention.

Although not required, the invention can be implemented via an operating system, for use by a developer of services for a device or object, and/or included within application or server software that operates in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video. Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Aspects of Post-Build Process to Record Stack and Call Tree Information

As mentioned above, there are at least two main aspects to the present invention: recording and using of (1) stack information and (2) call tree information. In the first main aspect, in FIG. 2, an authentication module (ModAuth 208) is illustrated. The ModAuth 208 walks up 209 a stack 204 during the execution of a program in order to identify any return addresses on the stack. The stack contains various types of data, such as local variables 210 and 214 and return addresses 212 and 216. Return addresses 212 and 216 are relevant herein, since they essentially define the control flow of an executing program, and can thus be modified by a hacker to cause the program to jump into foreign code. The invention, in this aspect, is directed to the detection and prevention of attempts to use the return addresses on the stack in such a manner.

Debug symbol files 220 assist the ModAuth 208 in walking up 209 the stack 204. These files 220 contain information 219 about the stack 204, such as frame sizes on a stack. Walking up the stack 204 may be difficult to do, so the debug symbol files 220 are used to help the ModAuth 208 in finding returns address, such as return address 212 and return address 216. It should be noted that the debug symbol files 220 may not be necessary to the stack walking 209, but they may make the job easier—especially in certain circumstances discussed below, such as when frame pointer optimization is employed.

A Post-Build Process Utility 222 collects 221 information 219 about the stack 204 contained in the debug symbol files 220, and stores that information within a special section of an executable program 218. Then, during runtime, ModAuth 208 refers 217 to this special section within the executable 218 in order to perform reliable stack walking 209. This reliable stack walking 209 results in the identification of return address on the stack 204, such as 212 and 216. As mentioned, by obtaining a return addresses, the ModAuth 208 can verify whether or not the return addresses are the intended return addresses or whether they may refer to foreign code.

Figure 2:
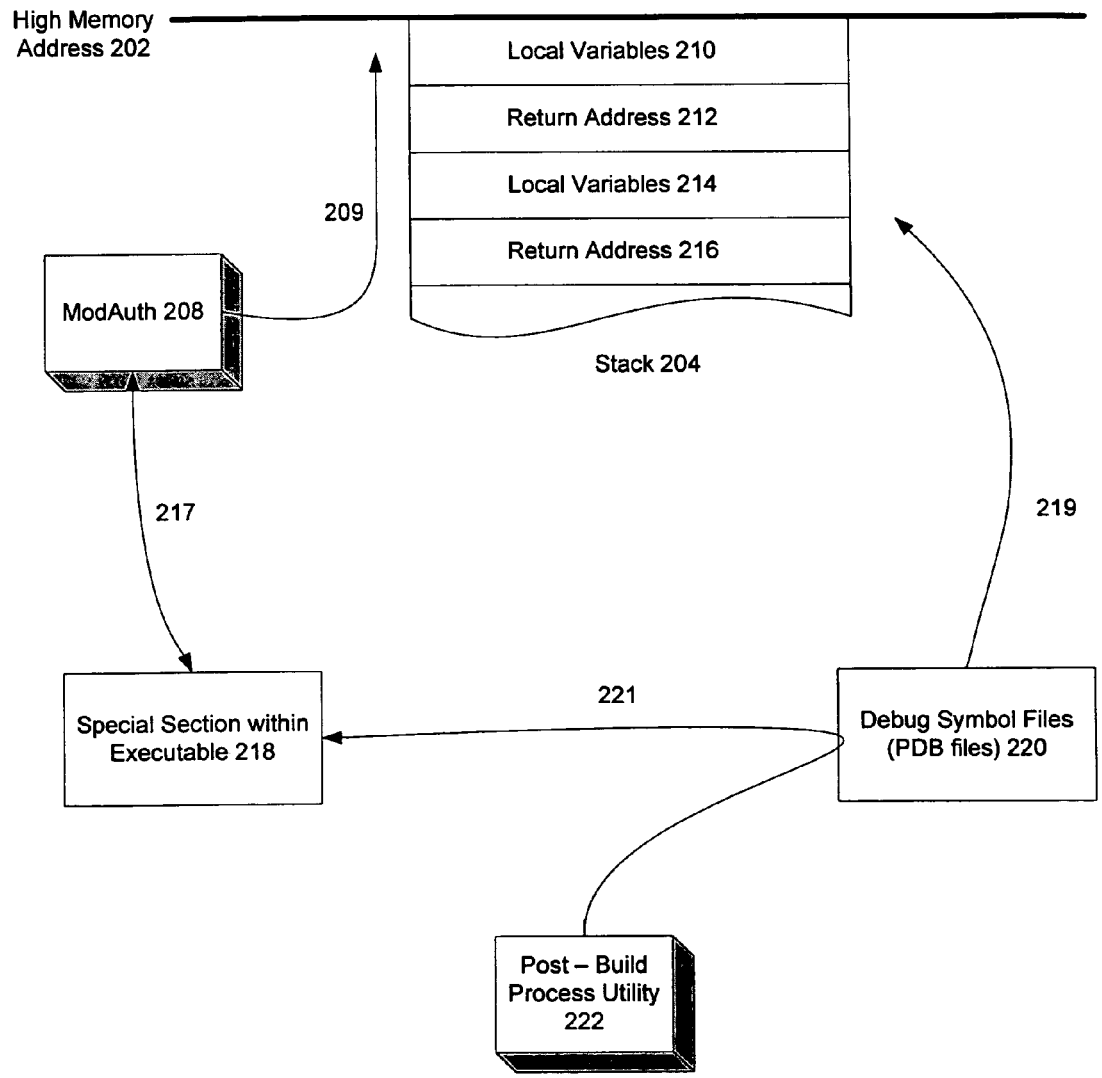
FIG. 2 illustrates an authentication module walking up a stack during the execution of a process with the help of a post-build utility.
Figure 3:
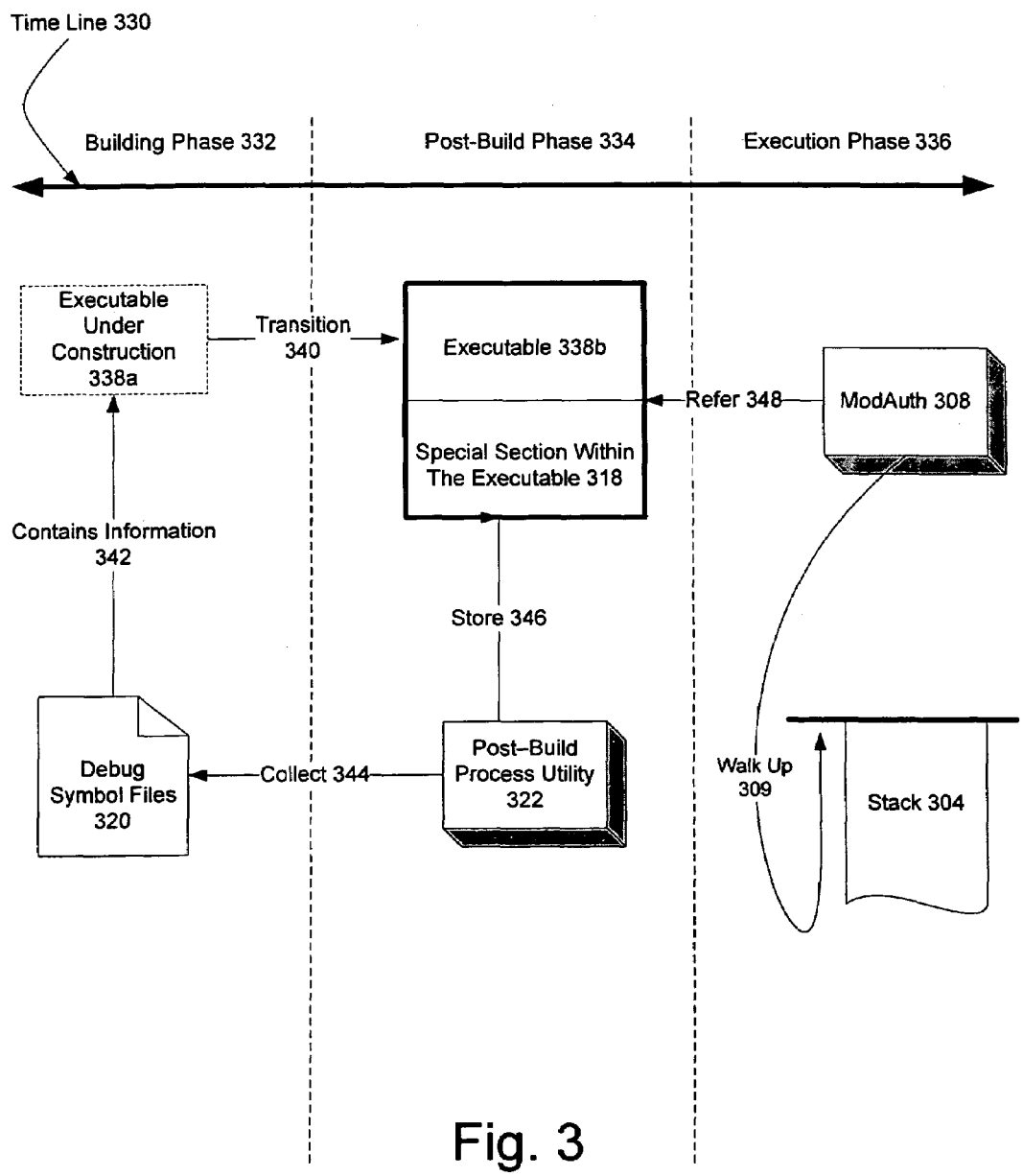
FIG. 3 illustrates a temporal aspect of the involvement of the post-build utility in the stack walking process.

FIG. 3 explains the temporal 300 aspect of FIG. 2. In other words, FIG. 3 divides time into three phases: a compilation or build phase 332, a post-build phase 334, and an execution phase 336. During the first of these phases 332, an executable program is under construction 338a. Debug symbol files are typically generated during the construction process in order to be used to debug a program. They contain useful information 342 about the program, such as the names of functions, and the functions' expected frame sizes at various points during their execution.

During the second phase, post-build phase 334, the post-build utility 322 stores 346 information it collects 344 from the debug symbol files 320 within a special section of an executable 318 (or alternatively, within a special section of an application or program, or even a separate file or container). Thus, the post-build phase 334 executable 338b contains or has access to specific stack information 318. (Moreover, as will be discussed below, it also contains call tree information). The ModAuth 308 then refers 348 to this information within the executable 318 in order to reliably walk up 309 a stack 304.

Use of debug symbols files 320 aids in reliable stack walking because stack walking is not always reliable. Stack walking can be fairly reliable when the compiler stores a previous stack frame in the memory location pointed to by a stack pointer. However, stack walking is not reliable in at least the following situations when: (1) the compiler does frame pointer optimization (FPO), where it does not store the frame pointer of a previous frame; or (2) during execution of the function, the distance of a frame pointer from a return address may change due to allocation functions or to the temporary pushing or popping of variables. Thus, debug symbols may be employed in order to provide sufficient information for stack walking.

The debug symbol files contain FPO records that give enough information to find the next function information on the stack without using frame pointers. For instance, the following sample call stack demonstrates the advantage to having debug symbols:

```
0012FF78 0040101D 0012FFC0 004010D3 00000001
00300ED0 !<nosymbols>
0012FF80 004010D3 00000001 00300ED0 00300E40
0012F640 !<nosymbols>
0012FFC0 77E9BC52 0012F640 0012F88F 7FFDF000
C0000005 !<nosymbols>
0012FFF0 00000000 0040101F 00000000 000000C8 00000100
kernel32!BaseProcessStart (FPO: Non-FPO [1,8,3])
```

The above call stack without debug symbols is difficult to interpret. In contrast, the following is a call stack with such symbols:

```
0012FF78 0040103D 0012FFC0 004010FA 00000001
00300ED0 !myfunction
0012FF80 004010FA 00000001 00300ED0 00300E40
0012F640 !main
0012FFC0 77E9BC52 0012F640 0012F88F 7FFDF000
C0000005 !mainCRTStartup
0012FFF0 00000000 00401046 00000000 000000C8 00000100
kernel32!BaseProcessStart (FPO: Non-FPO [1,8,3])
```

This call stack contains readable function names and so interpretation of the data on the stack, specifically, where function contexts begin and end is easier to ascertain, which results in more reliable stack walking.

Figure 4:
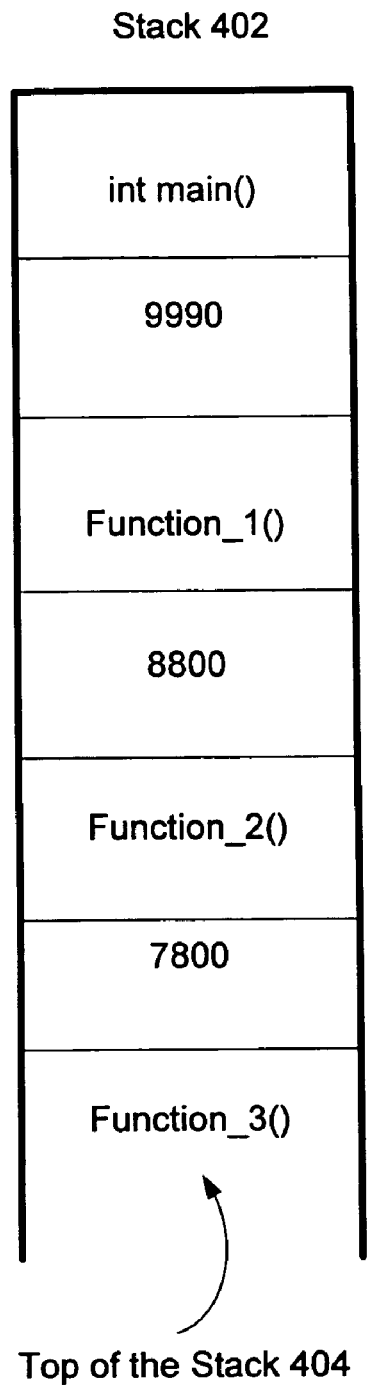
FIG. 4 illustrates an exemplary implementation of a stack with several function instances and return address.

FIG. 4 illustrates an exemplary use of a stack 400. The illustrated figure contains four simple "functions" on a stack. More accurately, it includes instances of functions and their local variables; but, for purposes of abstraction the functions themselves are depicted as residing on the stack. The main( ) function calls Function_1( ), which in turn calls Function_2( ), which in turn calls Function_3( ). Starting at the top of the stack 402, Function_3( ) provides the first output or manipulation of data, and after this occurance, Function_3( ) returns to the return address 7800 of Function_2( ). Upon return to Function_2( ), it in turn provides some sort of output. After this output, Function_2( ) returns via return address 8800 to Function_1( ), where this latter function performs some task. Last, upon Function_1( ) finishing its task, it returns to the main( ) function via return address 9990. The final output is the concatenation of events, starting with Function_3( ) and ending with function main( ). FIG. 4 should be compared to FIG. 5, immediately below.

Figure 5:
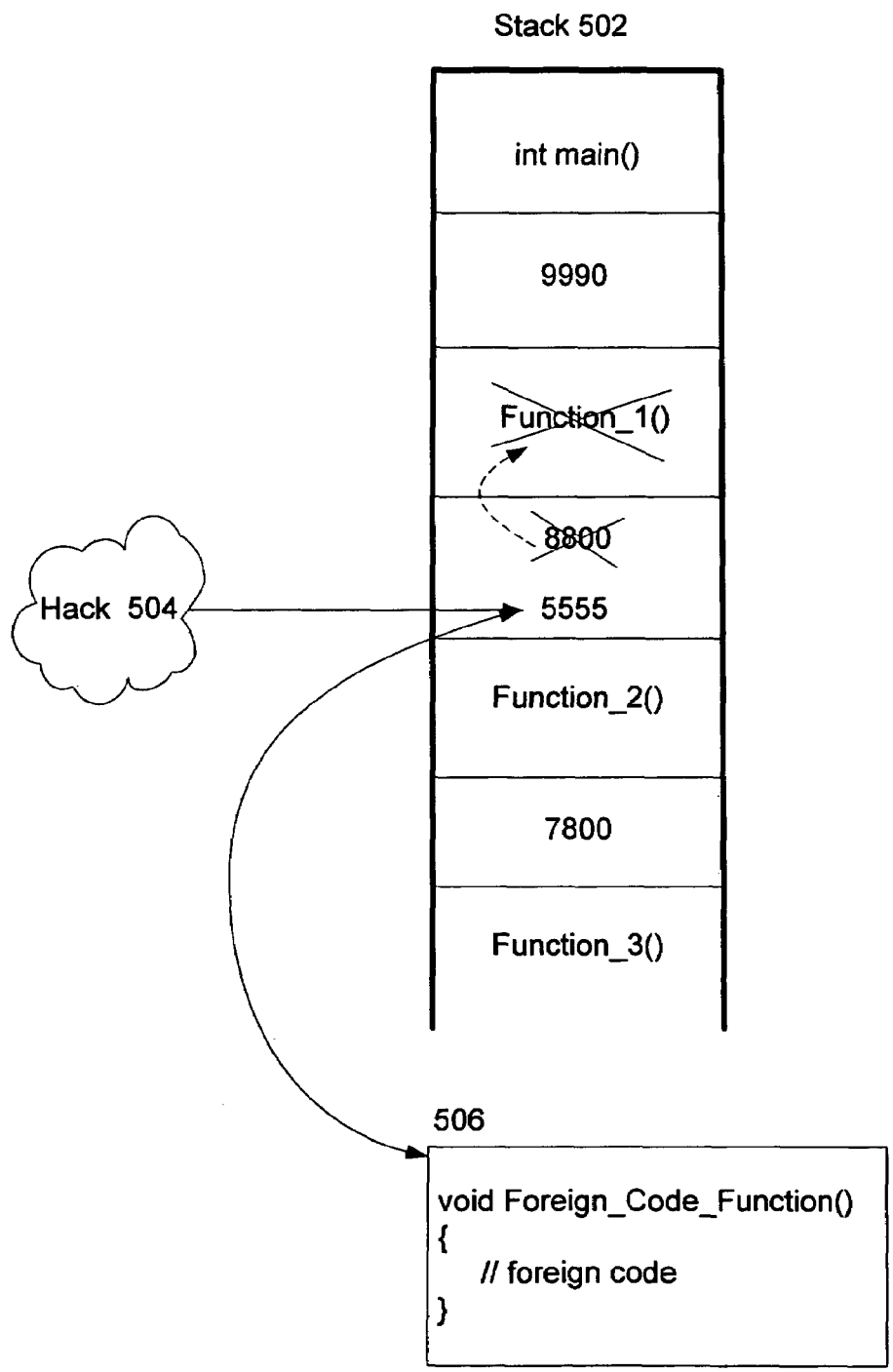
FIG. 5 illustrates what happens when a foreign code attempts to reference a typical return address via a hack.

FIG. 5 illustrates what happens if the exemplary implementation of the stack 402 in FIG. 4 is hacked. In FIG. 5, a stack 502 contains the same functions and function return addresses as the stack 402 in FIG. 4. Thus, the output of stack 502 is the same as the output of stack 402. The difference in FIG. 5, however, is that a hack 504 is performed on the stack 502 in such a way that one return address on the stack 502, namely, the 8800 return address is overwritten and substituted by the hack 606 with the 5555 return address.

The 5555 return address returns to the Foreign Code_Function( ) 506. Thus, when the stack 502 is executed, what happens is that first Function_3( ) provides its output and then returns to Function_2( ). Function_2( ), in turn, provides its output, but instead of returning to Function_1( ) via return address 8800, it instead returns to address 5555, which corresponds to Foreign_Code_Function( ) 506. This latter foreign code function 506 performs some nefarious activity. Next, after the Foreign_Code_Function( ) 506 ends, a return call is made to address 9990, which is main( ). Thus, the entire output of the hacked stack 502 differs from the output of FIG. 4 in the non-hacked stack 504.

In order to prevent such hacking of the stack and return addresses, a second main aspect of the invention is provided, namely, the call tree. The call tree is obtained in much of the same way as the stack information discussed in FIG. 3. In FIG. 6, again, a time line is illustrated 630 with three phases: building phase 632, post-build phase 634, and an execution phase 636. The same post-build utility 622 depicted in FIG. 3 is depicted here in FIG. 6. The post-build utility 622 collects 644 call tree information 620. The call tree information 620 contains information 642 about an executable program under construction 638a. Once the building phase 632 transitions 640 to the post-build phase 634, the post-build utility 622 stores 646 the call tree information 620 within a special section of the executable 618 (or alternatively in a separate file, depending on the program design).

Next, an authentication module 608 refers to this special section within the executable 618 in order to determines 652 what the call tree sequence should be based on the call tree information 620. In other words, the call tree information is what the calling sequence of functions ought to be, whereas the return address obtained from stack walking (FIGS. 2-5) is what the calling sequence actually is. Thus, by comparing this "ought" to the "is" a determination can be made whether the calling sequence is correct. If the call tree information is the same as the return address sequence (or, more generally, if the call tree information coincides with any given return address), than a conclusion can be reached that no foreign code is present. However, if the call tree information does not coincide with a particular return address, then a suspicion may be raised that foreign code is present and some preventive action should be taken. Example of preventive actions include process termination, altering of a monitor process, triggering an exception, and/or displaying UI.

Figure 7:
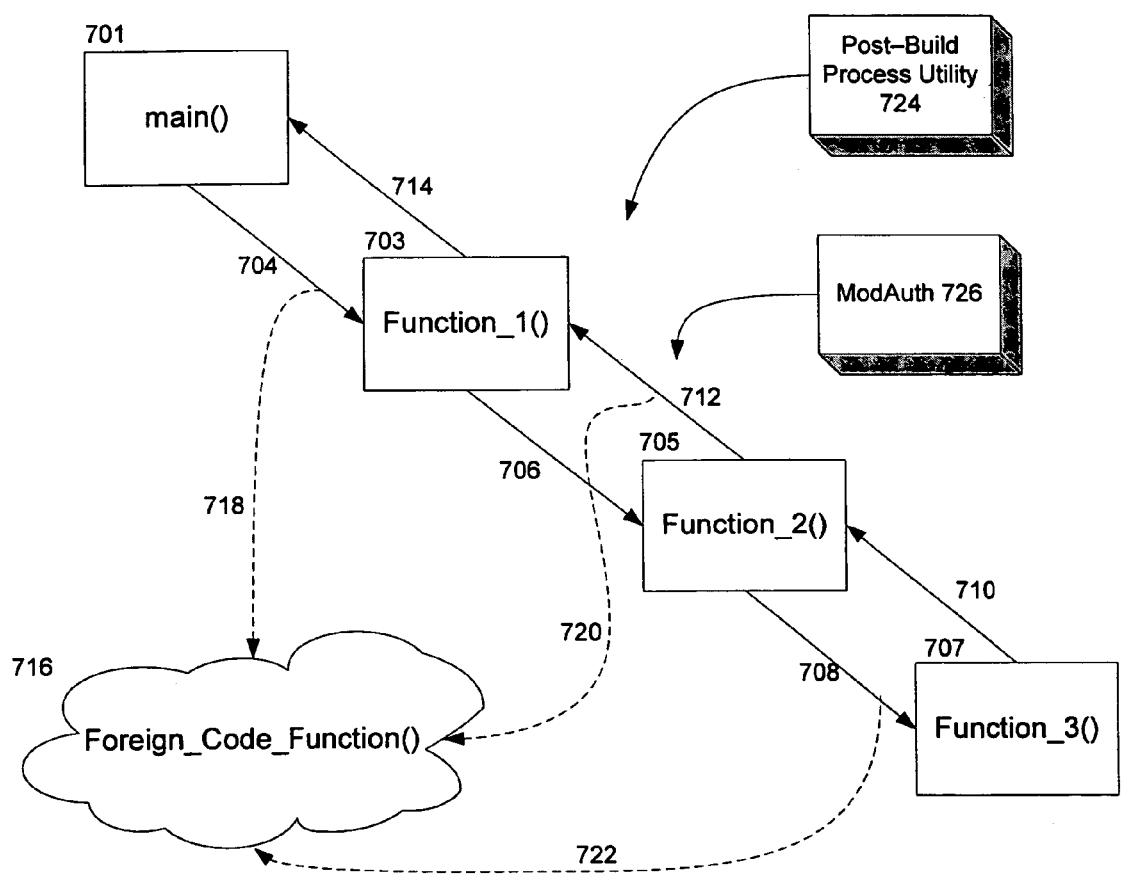
FIG. 7 illustrates a typical call tree based on function instances discussed in the previous figures and what happens when a hack is attempted.

FIG. 7 illustrates in more detail what is meant by a "call tree," and how this call tree can aid in preventing foreign code attacks. If a Foreign_Code_Function( ) 716 tries to implant itself in the 704-706-708-710-712-714 sequence, the sequence will be destroyed. For example, the Foreign_Code_Function( ) 716 could attempt to have the main( ) function 701 call 718 the Foreign_Code_Function( ) 716 instead of Function_1( ) 703. Likewise, it could also attempt to have Function_2( ) 705 call 722 it instead of Function_3( ) 707. Similarly, it could attempt to have Function_2( ) 705 return 720 to it instead of Function 10. However, all these attempts by the Foreign_Code_Function( ) 716 to implant itself would tip off any monitoring module that foreign code may be present.

Thus, the post-build utility 724 can record and store the call tree sequence discussed above within an executable program. When the executable is running, an authentication module, ModAuth 726, can refer to this sequence and see whether a stack sequence of return addresses is the same as the intended sequence stored within the executable. Such sequence verification ensures that foreign code will not be part of the sequence.

Figure 6:
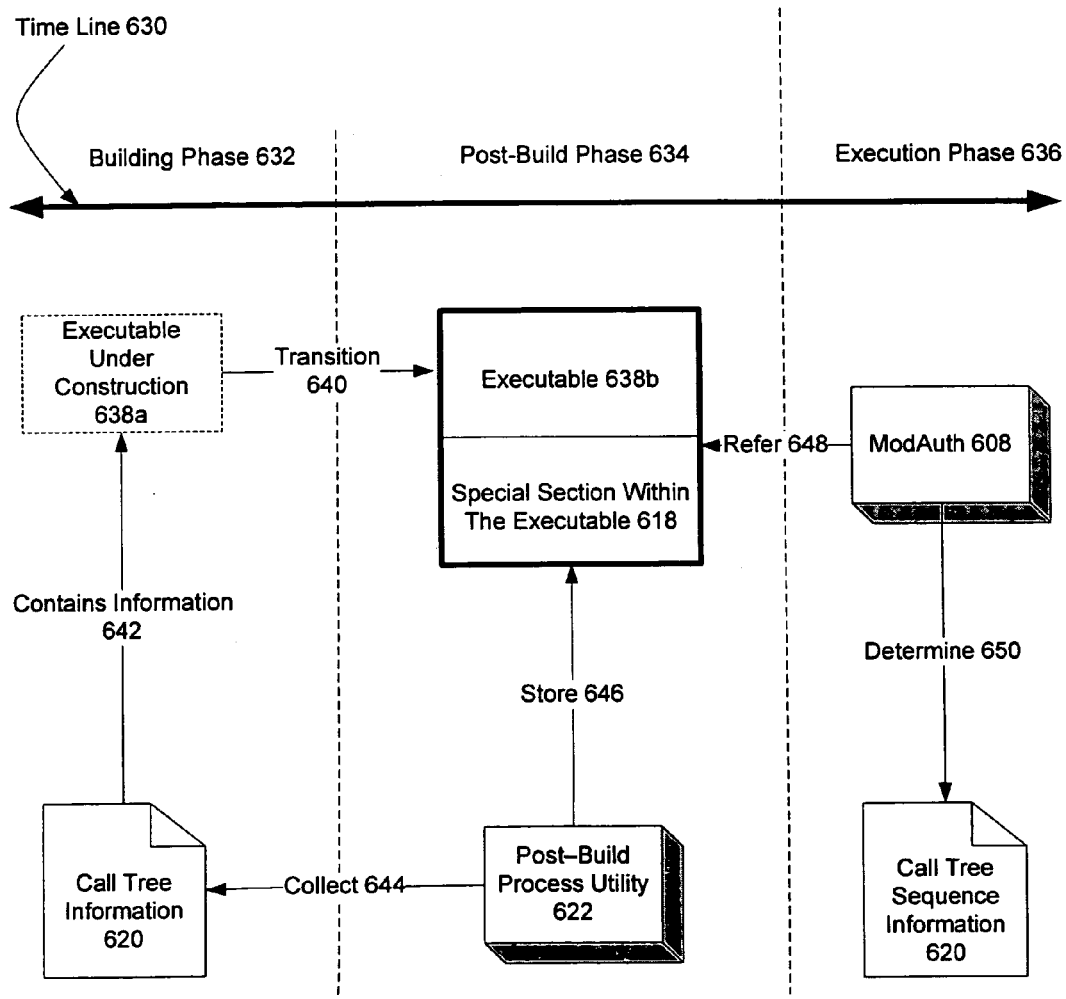
FIG. 6 illustrates a temporal aspect of the involvement of the post-built utility in the call tree process.
Figure 8:
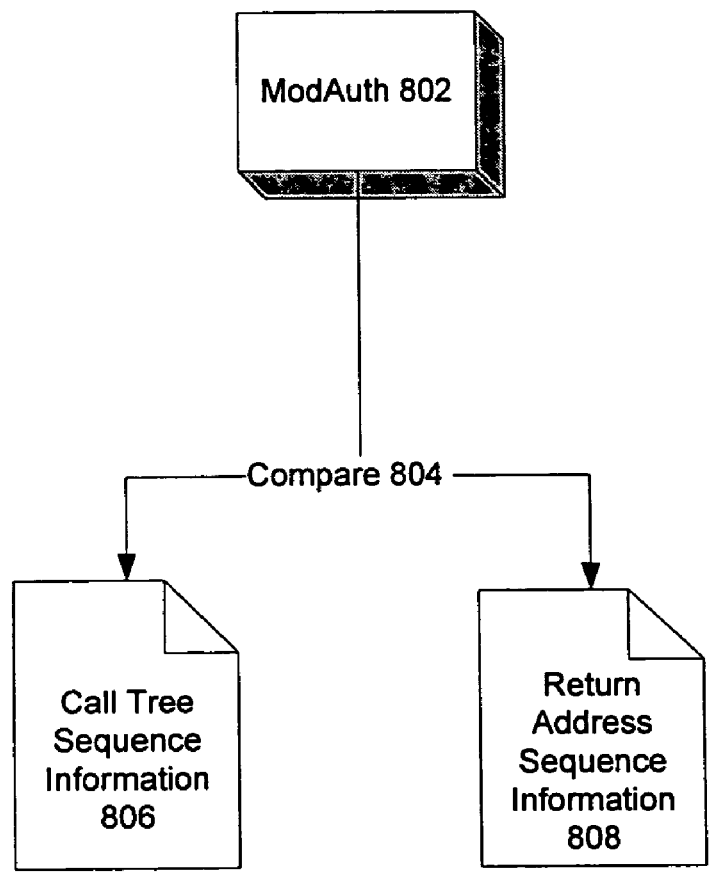
FIG. 8 illustrates the comparison that is made between the return address information that is obtained from the stack walking process to the call tree information.

To summarize FIG. 3-5, on the one hand, and FIG. 6-7, on the other, where the former set of figures deals with stack walking information and the latter set of figures deals with call tree information, FIG. 8 illustrates that both the stack information 808 (in the form of return addresses) and the call tree information 806 are used by an authentication module 802. This information is used in order to determine whether the actual calling sequence on a stack is consistent with the intended call tree sequence, or, put another way, whether any given return address on the stack is consistent with the call tree.

FIG. 9 shows an example process that can be carried out in accordance with one aspect the invention. As discussed above, debugger symbols are stored in some files, and these symbols contain information about executable programs under construction. At block 902, these debugger symbols are collected by a post-build utility. Then, at block 904, these collected symbols are stored within a special section in memory of an executable program so that they can be used later on by an authentication module, in order to perform reliable stack walking. In one aspect of the invention, these symbols tell the frame size of each function such that return addresses can be found by adding a current pointer to the frame size and obtain the next return address of a function.

Next, at block 906 the call tree information of the program is collected by the post-build utility. One purpose of such collection is to examine function call sequence. Certain functions only call other specified functions or certain functions only get called by other specified functions. For example, in a media player program, a decrypt function can only get called by a play function and no other function. Thus, if a foreign function attempts to call the decrypt function, it will break the play-decrypt function call sequence. Checking the call tree for intended calls and comparing it to any attempts to call the decrypt function by a non-play function, prevents unauthorized calls to the decrypt function. Finally, at block 908, as was true of the debugger symbols, the call tree information is stored within a special section of an executable.

As mentioned above, the use of these symbols is not strictly necessary, especially if no frame pointer optimization or temporary stack pushing and popping is performed, but these symbols are useful in reliable stack walking. At block 910, an authentication module refers to the stored symbols within the executable in order to walk up a stack. Such stack walking is performed in order to check for return addresses, specifically, to check if they may refer to foreign code. However, as persons of ordinary skill in the art will recognize, stack walking may be used for a variety of other purposes that concern foreign code detection.

Next, at block 912, the return addresses obtained at block 910 are compared to the call tree information which was stored at block 908. Such comparison of the return address to the call tree information allows for a determination of whether a foreign code hack has been performed. For example, if function sequence is A calls B, B calls C, C returns to B, and B returns to A, than this actual call sequence that is on the stack, and which was obtained by the stack walking discussed above, can be compared to the call tree sequence which is the intended call sequence.

Thus, if the intended call sequence (in the call tree) matches up to the actual call sequence (on the stack), then a conclusion can be made that there is no foreign code hack. This is the situation depicted at block 914, where in such a scenario the exemplary implementation continues with the execution of the executable. However, if the two sequences are different then protective measures may be taken the authentication module, as is depicted in block 916.

While the present invention has been described in connection with the preferred aspects, as illustrated in the various figures, it is understood that other similar aspects may be used or modifications and additions may be made to the described aspects for performing the same function of the present invention without deviating therefrom. For example, a stack walking process for return address detection and a process of obtaining the call tree information was described, where the return address information is compared to the call tree information, so that a determination can be made whether or not a hack by a foreign code has been performed. However, other equivalent devices to these described aspects are also contemplated by the teachings herein. Therefore, the present invention should not be limited to any single aspect, but rather construed in breadth and scope in accordance with the appended claims.

What is claimed:

1. A computer-implemented method for detecting whether a computer program has been subject to modification, the method comprising:
   generating a first data after the computer program build is completed and prior to execution of the computer program that is descriptive of a call tree associated with the program, wherein the call tree defines legitimate sequences of intended function calls within the program;
   generating a second data during execution of the program that is descriptive of actual function call sequence saved on a stack used by the program;
   using the first data and the second data during execution of the program to determine whether a return address on the stack is consistent with the call tree by comparing the intended first data function call against the second data function call as saved on the stack by comparing a sequence of return addresses to the sequence of function calls of the call tree;
   if the return address is consistent with the call tree, then allowing the program to proceed with execution at the return address; and
   if said return address is not consistent with said call tree, then taking at least one action comprising at least one of a process termination, altering a monitor process, or triggering an exception, to prevent or deter execution of a code referenced by the return address.

2. The method according to claim 1, wherein the first data and the second data is stored within a special section of the program.

3. The method according to claim 2, wherein a post-build utility stores the first data and the second data in the program.

4. The method according to claim 1, wherein at least one of the first data and the second data is stored in a separate file from the program.

5. The method according to claim 1, wherein for each return address in the sequence of function calls saved on the stack the return address is obtained by a module that walks up the stack.

6. The method according to claim 5, wherein the module walks up the stack with the help of debug symbols.

7. A computer readable storage medium bearing computer executable instructions for detecting whether an application has been hacked, comprising:
   collecting call tree information that is descriptive of a call tree associated with the application after a build of the application is completed and prior to execution of the application, wherein the call tree defines legitimate sequences of intended function calls within the application;
   collecting stack information during execution of the application that is descriptive of actual function calls saved on a stack used by the application;
   comparing the call tree information to the stack information, by comparing a sequence of return addresses to the sequence of function calls of the call tree, during execution of the application to determine whether a return address on the stack is consistent with the call tree, wherein one of the call tree information and the stack information is stored in one of a special section of the application and outside the application, after the call tree information and the stack information has been collected;
   if said return address is consistent with said call tree, then allowing the application to proceed with execution at said return address; and
   if said return address is not consistent with said call tree, then taking at least one action comprising at least one of a process termination, altering a monitor process, or triggering an exception, to prevent or deter execution of a code referenced by the return address.

8. The computer readable storage medium according to claim 7, wherein a post-build utility stores the call tree information and the stack information in the application.

9. The computer readable storage medium according to claim 7, wherein for each return address in the sequence of function calls saved on the stack the return address is obtained by a module that walks up the stack.

10. The computer readable storage medium according to claim 9, wherein the module walks up the stack with the help of debug symbols.

11. A system comprising a processor for detecting whether a computer program has been subject to modification comprising:
    a first data generated after the computer program build is completed and prior to execution of said program that is descriptive of a call tree associated with the program, the first data stored in a storage readable by the processor, wherein the call tree defines legitimate sequences of intended function calls within the program;
    a second data generated during execution of the program that is descriptive of actual function calls saved on a stack used by the program,
    an authentication module operative during execution of the program, wherein the first data and the second data is used during execution to determine whether a return address on the stack is consistent with the call tree, wherein the determining compares the intended first data function call against the second data function call as saved on the stack by comparing a sequence of return addresses to the sequence of function calls of the call tree;
    if the return address on the stack is consistent with the call tree, then allowing the program to proceed with execution at the return address, if the return address is not consistent with the call tree, then taking at least one action comprising at least one of a process termination, altering a monitor process, or triggering an exception, to prevent or deter execution of a code referenced by the return address.

12. The system according to claim 11, wherein the first data and the second data is stored within a special section of the program.

13. The system according to claim 12, wherein a post-build utility stores the first data and the second data in the program.

14. The system according to claim 11, wherein for each return address in the sequence of function calls saved on the stack the return address is obtained by a module that walks up the stack.

15. The system according to claim 14, wherein the module walks up the stack with the help of debug symbols.

* * * * *